US011157172B2

(12) United States Patent
Tang et al.

(10) Patent No.: US 11,157,172 B2
(45) Date of Patent: Oct. 26, 2021

(54) METHOD FOR MANAGING STORAGE DEVICES, ELECTRONIC DEVICE AND COMPUTER-READABLE MEDIUM

(71) Applicant: EMC IP Holding Company LLC, Hopkinton, MA (US)

(72) Inventors: Haiying Tang, Beijing (CN); Geng Han, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/836,362

(22) Filed: Mar. 31, 2020

(65) Prior Publication Data
US 2020/0341645 A1 Oct. 29, 2020

(30) Foreign Application Priority Data
Apr. 24, 2019 (CN) .......................... 201910336135.8

(51) Int. Cl.
*G06F 12/02* (2006.01)
*G06F 12/10* (2016.01)
*G06F 3/06* (2006.01)

(52) U.S. Cl.
CPC .......... *G06F 3/0607* (2013.01); *G06F 3/0631* (2013.01); *G06F 3/0689* (2013.01)

(58) Field of Classification Search
CPC ...... G06F 11/10; G06F 3/0607; G06F 3/0631; G06F 3/0632; G06F 3/0689
See application file for complete search history.

(56) References Cited

U.S. PATENT DOCUMENTS

| | | | |
|---|---|---|---|
| 8,799,705 B2 | 8/2014 | Hallak et al. | |
| 9,213,721 B1 | 12/2015 | Faibish et al. | |
| 9,342,465 B1 | 5/2016 | Meiri | |
| 9,442,941 B1 | 9/2016 | Luz et al. | |
| 9,495,486 B1 | 11/2016 | Aluru et al. | |
| 9,535,629 B1 | 1/2017 | Desimone et al. | |
| 10,055,161 B1 | 8/2018 | Meiri et al. | |
| 10,241,712 B1 | 3/2019 | Elliott, IV et al. | |
| 10,705,907 B1 | 7/2020 | Ben-Moshe et al. | |
| 10,783,078 B1 | 9/2020 | Meiri et al. | |
| 11,042,324 B2 | 6/2021 | Shveidel et al. | |
| 2020/0241762 A1* | 7/2020 | Gupta | G06F 3/0685 |

* cited by examiner

*Primary Examiner* — Yong J Choe
(74) *Attorney, Agent, or Firm* — BainwoodHuang (57) ABSTRACT

Techniques for managing storage devices involve: combining storage devices in a redundant array of independent disks (RAID) into a group of devices in an order of physical storage capacities; determining a first number of device sets based on a number of devices in the group and a threshold number of devices to be divided into each set, the number of the devices being greater than the threshold number; selecting at least one capacity promotion set from the group, each capacity promotion set including a second number of devices having a same physical capacity, the second number being equal to a sum of a width of the RAID and a number of devices in each set that is reserved; and forming the first number of sets by combining each of capacity promotion set and devices in the group other than each capacity promotion set.

18 Claims, 5 Drawing Sheets

METHOD FOR MANAGING STORAGE DEVICES, ELECTRONIC DEVICE AND COMPUTER-READABLE MEDIUM

CROSS REFERENCE TO RELATED APPLICATION

This application claims priority to Chinese Patent Application No. CN201910336135.8, on file at the China National Intellectual Property Administration (CNIPA), having a filing date of Apr. 24, 2019, and having "METHOD FOR MANAGING STORAGE DEVICES, ELECTRONIC DEVICE AND COMPUTER-READABLE MEDIUM" as a title, the contents and teachings of which are herein incorporated by reference in their entirety.

FIELD

Embodiments of the present disclosure generally relate to a field of data storage, and more specifically, to a method, electronic device and computer readable medium for managing storage devices.

BACKGROUND

Conventionally, a storage system is constructed with the technology of a redundant array of independent disks (RAID). In order to achieve high reliability of the storage system, it is required to restrict the number of storage devices involved in rebuilding of the storage system. When the number of storage devices in the storage system exceeds a threshold number, it needs to divide the storage devices into a plurality of sets of storage devices. How to perform the dividing becomes a hot issue.

SUMMARY

Embodiments of the present disclosure provide a method, electronic device and computer readable medium for managing storage devices.

In a first aspect of the present disclosure, there is provided a method of managing storage devices. The method includes: combining storage devices in a redundant array of independent disks into a group of storage devices in an order of physical capacities of the storage devices; determining a first number of sets of storage devices based on a number of the storage devices in the group and a threshold number of storage devices to be divided into each of the sets, the number of the storage devices being greater than the threshold number; selecting at least one capacity promotion set from the group of storage devices, each of the at least one capacity promotion set including a second number of storage devices having a same physical capacity, the second number being equal to a sum of a width of the redundant array of independent disks and a number of storage devices in each of the sets that are reserved; and forming the first number of sets by combining each of the at least one capacity promotion set and other storage devices in the group of storage devices than the at least one capacity promotion set.

In some embodiments, forming the first number of sets includes: forming a plurality of groups of candidate sets by combining each of the at least one capacity promotion set with the other storage devices in the group of storage devices than the at least one capacity promotion set, each of the groups of candidate sets including the first number of candidate sets; determining an effective capacity of each of the groups of candidate sets; and determining one of the plurality of groups of candidate sets that has a maximum effective capacity as the first number of sets.

In some embodiments, determining one of the plurality of groups of candidate sets that has a maximum effective capacity as the first number of sets includes: in response to determining that a first group of candidate sets and a second group of candidate sets in the plurality of groups of candidate sets both have the maximum effective capacity, selecting a first set having a maximum effective capacity from the first group of candidate sets and a second set having a maximum effective capacity from the second group of candidate sets; and in response to an effective capacity of the first set being greater than an effective capacity of the second set, determining the first group of candidate sets as the first number of the sets.

In some embodiments, the group of storage devices at least includes a first subgroup of storage devices having a first physical capacity and a second subgroup of storage devices having a second physical capacity, the first physical capacity being different from the second physical capacity; and selecting the at least one capacity promotion set from the group of storage devices includes: for each of the first subgroup of storage devices and the second subgroup of storage devices, in response to a number of storage devices in a respective subgroup of storage devices being above the second number, selecting the second number of storage devices from the respective subgroup of storage devices as one of the at least one capacity promotion set.

In some embodiments, combining storage devices in the redundant array of independent disks into the group of storage devices in the order of physical capacities of the storage devices includes: combining the storage devices in the redundant array of independent disks into the group of storage devices in a descending order of the physical capacities of the storage devices.

In a second aspect of the present disclosure, there is provided an electronic device. The electronic device includes at least one processor and a memory coupled to the processor. The memory stores computer programs. The computer programs, when executed by the processor, cause the electronic device to execute acts including: combining storage devices in a redundant array of independent disks into a group of storage devices in an order of physical capacities of the storage devices; determining a first number of sets of storage devices based on a number of the storage devices in the group and a threshold number of storage devices to be divided into each of the sets, the number of the storage devices being greater than the threshold number; selecting at least one capacity promotion set from the group of storage devices, each of the at least one capacity promotion set including a second number of storage devices having a same physical capacity, the second number being equal to a sum of a width of the redundant array of independent disks and a number of storage devices in each of the sets that are reserved; and forming the first number of sets by combining each of the at least one capacity promotion set and other storage devices in the group of storage devices than the at least one capacity promotion set.

In a third aspect of the present disclosure, there is provided a computer readable medium. The computer readable medium includes machine executable instructions. The machine executable instructions, when executed by a device, cause the device to perform the method according to the first aspect.

It would be appreciated that this Summary is not intended to identify key features or essential features in the embodiments of the present disclosure, nor is it intended to be used to limit the scope of the present disclosure. Other features of the present disclosure will become apparent through the description below.

BRIEF DESCRIPTION OF THE DRAWINGS

The above and other objectives, features and advantages of the present disclosure will become more apparent, through the following detailed description on the example embodiments of the present disclosure with reference to the accompanying drawings, in which the same reference symbols generally refer to the same elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will now be described in detail with reference to the accompanying drawings. Although the drawings illustrate some embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art. It would be appreciated that the drawings and the implementations as described herein are provided merely as examples, rather than limiting the protection scope of the present disclosure.

In the following description about the implementations of the present disclosure, the term "includes" and its variants are to be read as open-ended terms that mean "includes, but is not limited to." The term "based on" is to be read as "based at least in part on." The term "one embodiment/implementation" and "the embodiment/implementation" are to be read as "at least one embodiment/implementation." The terms "first," "second," and the like may refer to different or the same objects. Other definitions, either explicit or implicit, may be included below.

Figure 1:
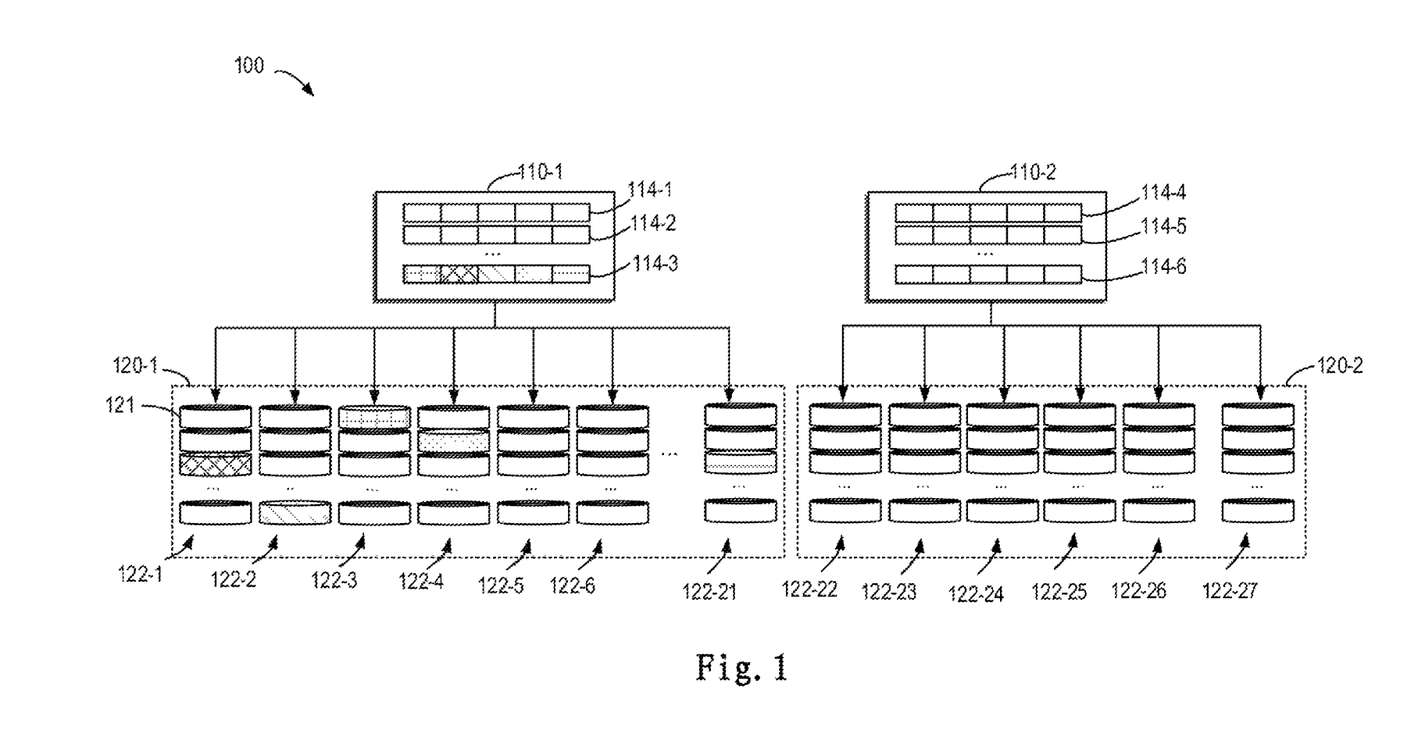
FIG. 1 shows a schematic diagram illustrating a storage system in which embodiments of the present disclosure may be implemented.

FIG. 1 is a schematic diagram illustrating a storage system 100 in which embodiments of the present disclosure may be implemented. The system 100 includes a plurality of physical storage devices 122-1, 122-2 . . . 122-27 for providing physical storage spaces. These storage devices may be collectively or individually referred to as storage devices 122 or a storage device 122. The storage devices 122 may be various persistent storage devices. For example, the storage devices 122 may include, but are not limited to, Digital Versatile Discs (DVDs), Blu-ray Discs (BDs), Compact Discs (CDs), floppy disks, hard disks, tape drives, optical drives, Solid-State Memory Devices (SSD), and the like. Each of the storage devices 122 may be partitioned into a plurality of slices 121. Each of the slices 121 has a fixed storage capacity. The RAID may combine the sections or slices 121 on different storage devices into RAID stripes 114 which may include stripes 114-1, 114-2 . . . 114-6. For example, the RAID may form a stripe 114-3 for RAID 5 on the respective slices 121 on the storage devices 122-1, 122-2, 122-3, 122-4 and 122-21.

In order to ensure reliability of the RAID, it is typically required to allocate, within a limited number of storage devices, sections or slices to the RAID stripes. The limited number of storage devices form a set of storage devices. If the number of storage devices in a system is greater than the limited number, there may be a further set of storage devices. In other words, the storage system 100 may divide, based on the number of the storage devices, the plurality of storage devices into one or more sets of storage devices, and slices in the same RAID stripe 114 come from the storage devices in the same set of storage devices. In this way, the number of the storage devices in such set of storage devices can meet a minimum number of storage devices required for establishing an RAID strip. In addition, the number of storage devices in a set of storage devices cannot be too great. Otherwise, it may bring about a higher failure probability of the storage devices and thus reduce the reliability. As shown in FIG. 1, the plurality of physical storage devices 122-1, 122-2 . . . 122-27 in the system 100 are divided into a first set of storage devices 120-1 and a second set of storage devices 120-2. The first set of storage devices 120-1 includes the storage devices 122-1, 122-2 . . . 122-21, and the second set of storage devices 120-2 includes the storage devices 122-22, 122-23 . . . 122-27. In the RAID, slices in the first RR 120-1 form a first set of stripes 110-1, and slices in the second set of storage devices 120-2 form a second set of stripes 110-2. The first set of stripes 110-1 includes stripes 114-1, 114-2 . . . 114-3, and the second set of storage devices 110-2 includes stripes 114-4, 114-5 . . . 114-6.

Typically, only when the number of storage devices in the existing set of storage devices in the RAID is not greater than the limited number, it is allowed to add new storage devices to the existing set of storage devices. If the number of storage devices in the set of storage devices is greater than a threshold number and the number of new storage devices does not satisfy the RAID width requirement, the new storage devices cannot be added to the set of storage devices. If the number of the new storage devices satisfies the RAID width requirement, the new storage devices may be successfully added to the RAID, and a new set of storage devices thus is formed. Since the current storage system does not support re-allocation of storage devices in the existing set of storage devices and the new set of storage devices, it may not be the optimum solution to form a new set of storage devices, considering the total effective capacity of the RAID.

According to embodiments of the present disclosure, there is provided a solution for allocating storage devices to support expansion for a set of storage devices. The solution includes combining storage devices in a RAID into a group of storage devices in an order of physical capacities of the storage devices; determining a first number of sets of storage devices based on a number of the storage devices in the group and a threshold number of storage devices to be divided into each of the sets, the number of the storage devices being greater than the threshold number; selecting at least one capacity promotion set from the group of storage devices, each of the at least one capacity promotion set including a second number of storage devices having a same physical capacity, the second number being equal to a sum of a width of the redundant array of independent disks and a number of storage devices in each of the sets that are reserved; and forming the first number of sets by combining each of the at least one capacity promotion set and other storage devices in the group of storage devices than the at least one capacity promotion set. The solution according to embodiments of the present disclosure can support addition of any number of new storage devices to the existing sets of storage devices by providing re-allocation of the storage devices to the sets of storage device. Moreover, since each capacity promotion set and other storage devices in the group than the at least one capacity promotion set are combined into a plurality of sets, the effective capacity of the RAID can be optimized and the utilization efficiency of storage devices can be improved.

Figure 2:
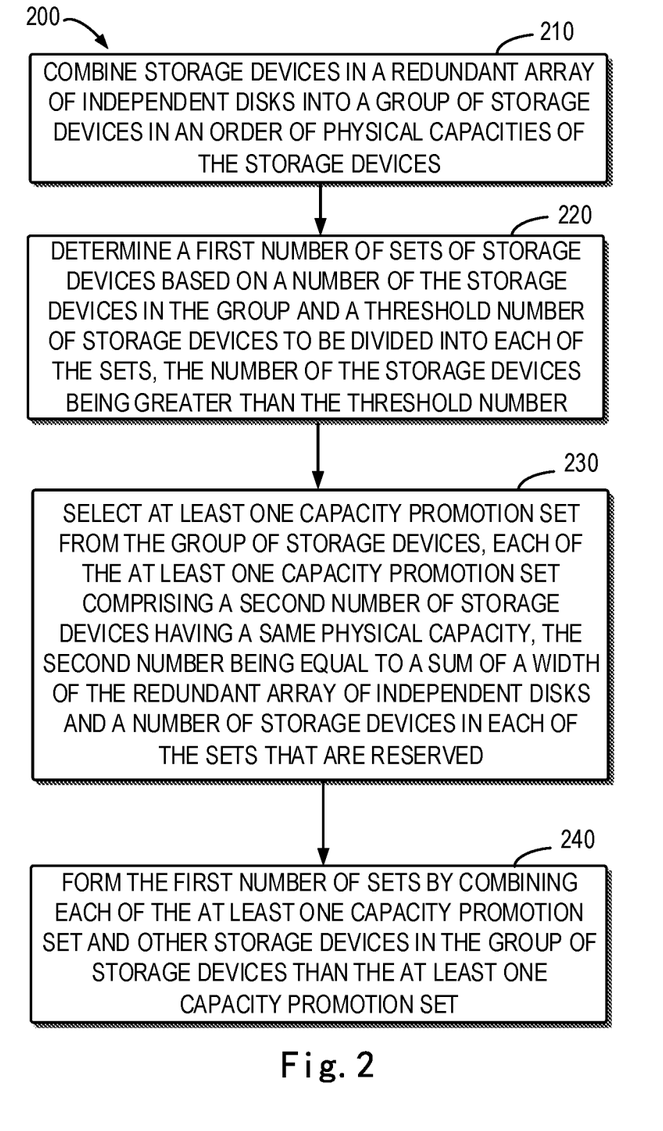
FIG. 2 shows a block diagram of a method of managing storage devices according to some embodiments of the present disclosure.

Embodiments of the present disclosure will be detailed below with reference to the accompanying drawings. FIG. 2 is a block diagram illustrating a method 200 of managing storage devices according to embodiments of the present disclosure. The method 200 may be implemented in the storage system 100 in FIG. 1 and executed by a processor. For ease of discussion, the method 200 will be described with reference to FIG. 1.

At block 210, storage devices in a RAID are combined into a group of storage devices in an order of physical capacities of the storage devices. In some embodiments, the storage devices may include a plurality of storage devices for initializing the RAID. In other embodiments, the storage devices may include storage devices in at least one existing set of storage devices in the RAID and include new storage devices to be added to the RAID.

In some embodiments, the storage devices in the RAID may be combined into the group of storage devices in a descending order of the physical capacities. In other embodiments, the storage devices in the RAID may be combined into the group of storage devices in an ascending order of the physical capacities.

At block 220, a first number of sets of storage devices is determined based on a number of the storage devices in the group and a threshold number of storage devices to be divided into each of the sets. The number of the storage devices is greater than the threshold number. In some embodiments, the sets into which the storage devices are to be divided may be RAID Resiliency Sets (RRSs). For the purpose of discussion, RRSs will be taken below as an example of the sets into which the storage devices are to be divided for describing embodiments of the present disclosure.

In some embodiments, the threshold number of storage devices in each set may be any appropriate number. For example, the threshold number may be 25.

In some embodiments, based on the number of storage devices and the threshold number of the storage devices in each set, the first number of the plurality of sets may be determined as a minimum integer greater than a quotient of dividing the number of storage devices by the threshold number. For example, if the number of storage devices is 30 and the threshold number of storage devices in each set is 25, the first number of the plurality of sets is determined as $\lceil 30/25 \rceil$ (i.e., 2). For another example, if the number of storage devices is 60 and the threshold number of storage devices in each set is 25, the first number of the plurality of sets is determined as $\lceil 60/25 \rceil$ (i.e., 3).

At block 230, at least one capacity promotion set is selected from the group of storage devices. Each of the at least one capacity promotion set includes a second number of storage devices having a same physical capacity. The second number is equal to a sum of a width of the redundant array of independent disks and a number of storage devices in each of the sets that are reserved. Hereinafter, for ease of discussion, in an RRS, the capacity promotion set is also referred to as RRS head, and a subset of storage devices formed by storage devices subsequent to the RRS head is referred to as RRS body.

In some embodiments, the group of storage devices at least includes a first subgroup of storage devices having a first physical capacity and a second subgroup of storage devices having a second physical capacity. The first physical capacity is different from the second physical capacity. In such embodiments, selecting at least one RRS head from the group of storage devices includes: for each of the first subgroup of storage devices and the second subgroup of storage devices, executing the following acts. It is determined whether the number of storage devices in a respective subset of storage devices is above the second number (i.e., a sum of the width of the RAID and the number of storage devices in each of the sets that are reserved). In other words, it is determined whether the number of storage devices in the respective subgroup of storage devices is greater than or equal to the second number. If the number of storage devices in the respective subgroup of storage devices is greater than or equal to the second number, the second number of storage devices are selected from the subgroup of storage devices as an RRS head. On the other hand, if the number of storage devices in the respective subgroup of storage devices is less than the second number, all of the storage devices in the subgroup of storage devices act as an RRS body.

Continuing to refer to FIG. 2, at block 240, the first number of sets are formed by combining each of the at least one capacity promotion set and other storage devices in the group of storage devices than the at least one capacity promotion set.

Below Table 1 shows an example of combinations of RRS heads and RRS bodies in an embodiment using a configuration of 4D+1P RAID 5, in which the threshold number of storage devices in each set is 25.

TABLE 1

| Example | RRS Head | | RRS Body | |
|---|---|---|---|---|
| | RRS0 | RRS1 | RRS0 | RRS1 |
| (1) 5 disks $D_0$ and 5 disks | Ø | NA | $D_0, D_0, D_0,$ $D_0, D_0, D_1,$ | NA |

TABLE 1-continued

| | RRS Head | | RRS Body | |
|---|---|---|---|---|
| Example | RRS0 | RRS1 | RRS0 | RRS1 |
| $D_1$ (because the total number <26 disks, only 1 RRS will be created) | | | $D_1, D_1, D_1, D_1$ | |
| (2) 6 disks $D_0$ and 6 disks $D_1$ (because the total number <26 disks, only 1 RRS will be created) | $D_0, D_0, D_0, D_0, D_0, D_0$ | NA | $D_1, D_1, D_1, D_1, D_1, D_1$ | NA |
| (3) 16 disks $D_0$ and 10 disks $D_1$ (because the total number = 26 disks, 2 RRSs will be created) | $D_0, D_0, D_0, D_0, D_0, D_0$ | $D_1, D_1, D_1, D_1, D_1, D_1$ | $D_0, D_0, D_0, D_0, D_0, D_0, D_0, D_1, D_1, D_1, D_1$ | Ø |
| (4) 15 disks $D_0$, 6 disks $D_1$ and 5 disks $D_2$ (because the total number = 26 disks, 2 RRSs will be created) | $D_0, D_0, D_0, D_0, D_0, D_0$ | $D_1, D_1, D_1, D_1, D_1, D_1$ | $D_0, D_0, D_0, D_0, D_0, D_0, D_0, D_2, D_2, D_2, D_2, D_2$ | Ø |
| (5) 6 disks $D_0$, 5 disks $D_1$, 5 disks $D_2$, 5 disks $D_3$ and 5 disks $D_4$ (because the total number = 26 disks, 2 RRSs will be created) | $D_0, D_0, D_0, D_0, D_0, D_0$ | Ø | $D_1, D_1, D_1, D_1, D_1, D_2, D_2, D_2, D_2, D_2, D_3, D_3, D_3, D_3, D_3$ | $D_3, D_4, D_4, D_4, D_4, D_4$ |

In Table 1, it is assumed that there are two RRSs, namely RRS0 and RRS1. $D_0$ represents a storage device having a first physical capacity, $D_1$ represents a storage device having a second physical capacity, $D_2$ represents a storage device having a third physical capacity, $D_3$ represents a storage device having a fourth physical capacity, and $D_4$ represents a storage device having a fifth physical capacity, where the physical capacities of $D_0$ to $D_4$ are decreased.

It may be seen from the example of Table 1 that one RRS may include only an RRS head (for example, in the example (1)) or an RRS body, or may include both of them. For example, in the example (1) of Table 1, the RRS0 only includes the RRS body, while the RRS1 in the examples (3) and (4) only include the RRS head.

A process will be described below with reference to FIG. 3 in which the first number of sets are formed by combining each of the at least one capacity promotion set and other storage devices in the group of storage devices than the at least one capacity promotion set.

Figure 3:
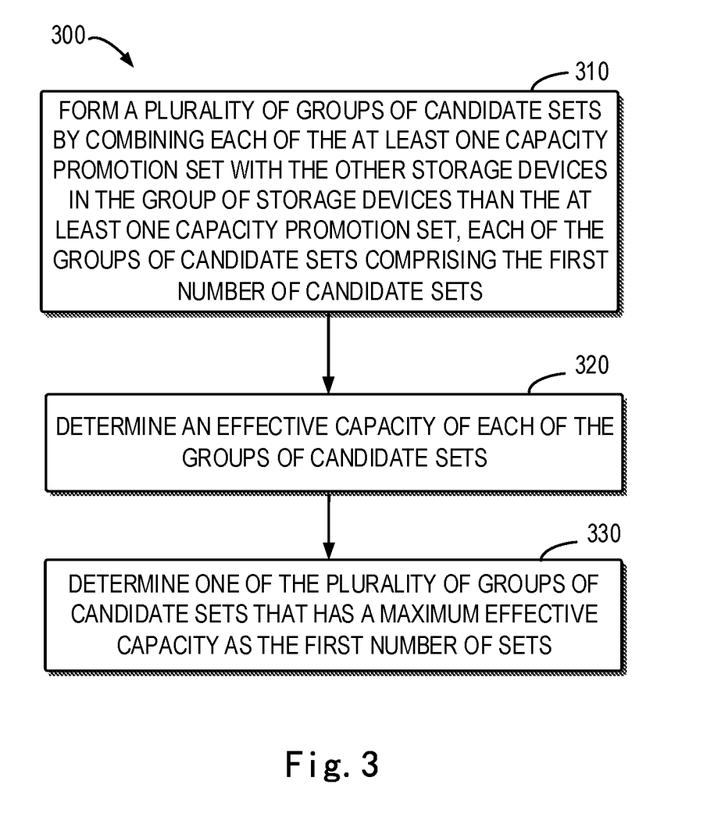
FIG. 3 shows a block diagram of a method of managing storage devices according to other embodiments of the present disclosure.

As shown in FIG. 3, at block 310, a plurality of groups of candidate sets are formed by combining each RRS head and other storage devices in the group of storage devices than the RRS head. Each group of candidate sets includes a first number of candidate sets. In other words, the number of candidate sets is equal to the number of the plurality of sets into which the storage devices are to be divided.

In some embodiments, a list of all RRS heads and a list of all RRS bodies may be created, and all combinations of items in the two lists (i.e., a plurality of groups of candidate sets formed by items in the two lists) are determined by traversing the two lists.

The list of all RRS heads includes all possible allocations of a respective RRS head to RRSs. For example, in a storage system including 13 storage devices $D_0$ having a first physical capacity and 13 storage devices $D_1$ having a second physical capacity, there may be two RRSs. A first RRS head (which is represented by pds0) in the two RRS heads includes 6 storage devices $D_0$, and a second RRS head (which is represented by pds1) in the two RRs heads includes 6 storage devices $D_1$. In the example, there are four possible allocations of the RRS heads of the RRSs, which are listed below:

pds0 is allocated to RRS0, pds1 is allocated to RRS1;
  pds1 is allocated to RRS0, pds0 is allocated to RRS1;
  both pds0 and pds1 are allocated to RRS0; and
  both pds0 and pds1 are allocated to RRS1.

The list of all RRS bodies includes all possible allocations of a respective RRS body to RRSs. Since the storage devices in the RRS body are always sorted in an order of physical capacities of the storage devices, allocation of the storage devices in the RRS body to the RRSs can be implemented by partitioning the list without changing the order of the storage devices. For example, still consider the above example in which 13 storage devices $D_0$ having a first physical capacity and 13 storage devices $D_1$ having a second physical capacity are included. The RRS body includes 14 storage devices containing 7 storage devices $D_0$ and seven storage devices $D_1$. In the example, there are four possible allocations of the RRS bodies to the RRSs, which are given below:

1. no storage device is allocated to RRS0, all of the 14 storage devices are allocated to RRS1;
2. 1 $D_0$ is allocated to RRS0, all other 13 storage devices are allocated to RRS1;
3. 2 $D_0$ are allocated to RRS0, all other 12 storage devices are allocated to RRS1;
. . .
14. 7 $D_0$ and 6 $D_1$ are allocated to RRS0, 1 $D_1$ is allocated to RRS1; and
15. all of the 14 storage devices are allocated to RRS0, no storage device is allocated to RRS1.

The following Tables 2 and 3 show the list of RRS heads and the list of RRS bodies in the above example, respectively.

TABLE 2

| RRS Head | |
|---|---|
| RRS0 | RRS1 |
| $[D_0, D_0, D_0, D_0, D_0, D_0]$ | $[D_1, D_1, D_1, D_1, D_1, D_1]$ |
| $[D_1, D_1, D_1, D_1, D_1, D_1]$ | $[D_0, D_0, D_0, D_0, D_0, D_0]$ |
| $[D_0, D_0, D_0, D_0, D_0, D_0, D_1, D_1, D_1, D_1, D_1, D_1]$ | Ø |
| Ø | $[D_0, D_0, D_0, D_0, D_0, D_0, D_1, D_1, D_1, D_1, D_1, D_1,]$ |

TABLE 3

| RRS Body | |
|---|---|
| RRS0 | RRS1 |
| Ø | $[D_0, D_0, D_0, D_0, D_0, D_0, D_1, D_1, D_1, D_1, D_1, D_1, D_1]$ |
| $[D_0]$ | $[D_0, D_0, D_0, D_0, D_0, D_1, D_1, D_1, D_1, D_1, D_1, D_1]$ |
| $[D_0]$ | $[D_0, D_0, D_0, D_0, D_1, D_1, D_1, D_1, D_1, D_1, D_1]$ |
| . . . | . . . |
| $[D_0, D_0, D_0, D_0, D_0, D_0, D_1, D_1, D_1, D_1, D_1, D_1]$ | $[D_1]$ |
| $[D_0, D_0, D_0, D_0, D_0, D_0, D_1, D_1, D_1, D_1, D_1, D_1, D_1]$ | Ø |

Still referring to FIG. 3, upon determining all combinations of the items in the two lists by traversing the list of RRS heads and the list of RRS bodies, an effective capacity of each combination (i.e., each group of candidate sets) is determined at block 320. It would be appreciated that when the items in the list of RRS heads and the list of RRS bodies are being combined, if the number of storage devices after combining is less than the sum of the width of the RAID and the number (for example, 6) of storage devices in each set that are reserved, or greater than a threshold number (for example, 25) of storage devices in each set, the combination is considered invalid. Therefore, there is no need to calculate the effective capacity for the combination.

Figure 4:
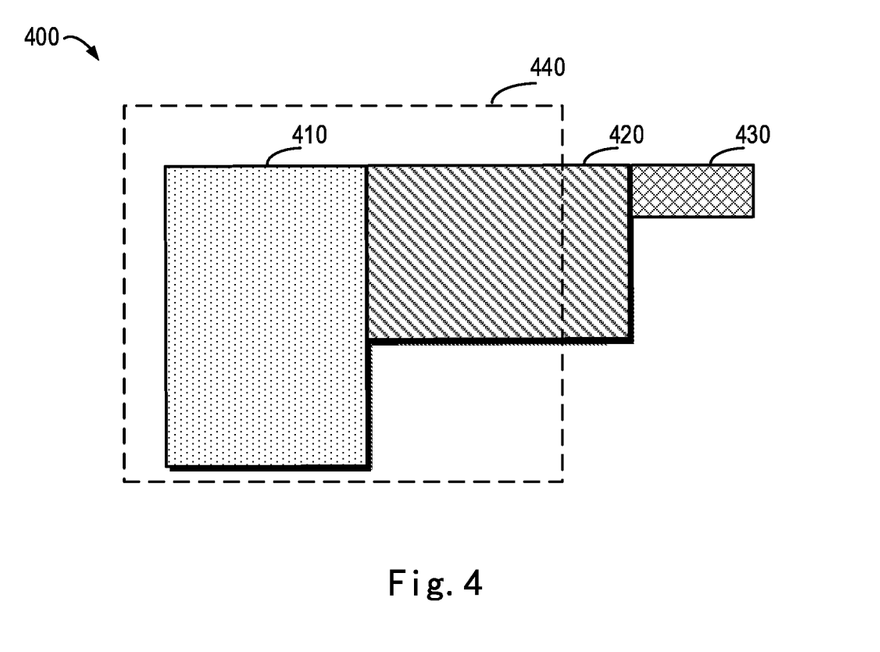
FIG. 4 shows a schematic diagram illustrating an RAID according to some embodiments of the present disclosure.

Determination of the effective capacity according to embodiments of the present disclosure will be described below with reference to FIG. 4. FIG. 4 is a schematic diagram illustrating an RAID 400 according to an embodiment of the present disclosure. As shown in FIG. 4, the RAID 400 includes a first set of storage devices 410, a second set of storage devices 420, and a third set of storage devices 430, which are arranged in a descending order of the physical capacities of the storage devices.

The first set of storage devices 410 includes 3 storage devices each having a physical capacity of $C_{large}$. The second set of storage devices 420 includes 4 storage devices each having a physical capacity of $C_{middle}$. The third set of storage devices 430 includes 2 storage devices each having a physical capacity of $C_{small}$, where $C_{large} > C_{middle} > C_{small}$.

In some embodiments, based on the configuration of the RAID 400 and the number of storage devices that are reserved in the RAID 400, the number of slices required for stripe allocation is determined. For example, in a case where the RAID 400 has the configuration of 4D+1P RAID-5 and the number of the reserved storage device is 1, the number of slices required for stripe allocation is 5+1 (i.e., 6).

Further, in the descending order of the physical capacities, the determined number (for example, 6) of storage devices are selected from the RAID 400 to form a subset of storage devices. For example, in the example of FIG. 4, all of the three storage devices in the first set of storage devices 410 and the three storage devices in the second set of storage devices 420 are selected from the RAID 400 to form a subset of storage devices 440. In other words, the subset of storage devices 440 includes three storage devices each having a physical capacity of $C_{large}$ and three storage devices each having a physical capacity $C_{middle}$.

Further, the physical capacity of the storage devices having the minimum physical capacity in the subset of storage devices 440 is determined as an effective capacity of each storage device in the subset of storage devices 440. For instance, in the above example, the physical capacity $C_{middle}$ of the storage devices having the physical capacity $C_{middle}$ is an effective capacity of each storage device in the subset of storage devices 440.

In addition, for other storage devices in the RAID 400 than the subset of storage devices 440, their physical capacities are determined as their respective effective capacities.

Therefore, in the above example, a total effective capacity of the RAID 400 is equal to $7*C_{middle} + 2*C_{small}$.

It would be appreciated that if the subset of storage devices 440 includes 6 storage devices having the physical capacity of $C_{large}$, i.e., a capacity promotion set comprised of 6 storage devices having the physical capacity of $C_{large}$, it can be determined that the effective capacity of each storage device in the subset of storage devices 440 is $C_{large}$ (i.e., being equal to its respective physical capacity). Therefore, the effective capacity of the respective storage device in the RAID 400 is equal to its respective physical capacity, thereby achieving maximization of the effective capacity of the RAID 400.

Returning to FIG. 3, at block 330, one of the plurality of groups of candidate sets that has a maximum effective capacity is determined as the first number of sets.

In some embodiments, if it is determined that both the first group of candidate sets and the second group of candidate sets in the plurality of groups of candidate sets have the maximum effective capacity, a first set having a maximum effective capacity is selected from the first group of candidate sets and a second set having a maximum effective capacity is selected from the second group of candidate sets. If the effective capacity of the first set is greater than that of the second set, the first group of candidate sets is determined as the first number of sets.

For example, in the embodiment in which a configuration of 4D+1P RAID 5 is used and the threshold number of storage devices in each RRS is 25, there are 6 storage devices $D_0$ having a first physical capacity, and 20 storage devices $D_1$ having a second physical capacity, wherein the first physical capacity is greater than the second physical capacity. For the above 26 storage devices, there are two allocation options:

Option 1: RRS1: $[D_0, D_0, D_0, D_0, D_0, D_0, D_1, D_1, \ldots, D_1]$,
RRS2: $[D_1, D_1, D_1, D_1, D_1, D_1]$
Option 2: RRS3: $[D_0, D_0, D_0, D_0, D_0, D_0]$,
RRS4: $[D_1, D_1, D_1, \ldots, D_1]$.

In Option 1, the above 26 storage devices are divided into RRS1 and RRS 2, where the effective capacity of RRS1 is greater than the effective capacity of RRS2. In Option 2, the above 26 storage devices are divided into RRS3 and RRS4, wherein the effective capacity of RRS3 is greater than the counterpart of RRS4. Since the effective capacity of RRS1 in Option 1 is greater than the effective capacity of RRS3, Option 1 is used for dividing the above 26 storage devices.

Moreover, in some embodiments, computation complexity of the method 300 is analyzed. From the allocation procedure, it can be obtained that the computation complexity of the algorithm mainly depends on scanning of the RRS head list and the RRS body list, which in turn depends on the number of items in the RRS head list and RRS body list.

In a storage system, there may be 2, 3 or 4 RRSs in total. If a number of RRS heads is equal to the number of RRSs, for a different number of RRSs, possible items of the RRS head list may be obtained easily as following, where C is the number of items in the RRS head list, and M is the number of RRSs (the sample of M=2 is actually shown in Tables 2 and 3):

$$\begin{cases} C = 4, \text{ when } M = 2, \\ C = 27, \text{ when } M = 3, \\ C = 220, \text{ when } M = 4. \end{cases}$$

When the storage system includes N RRS heads and M RRSs, where N is not less than M, first the M RRSs are selected, then the M RRS heads are allocated to M groups, and therefore the total number of items in the RRS head list is $C_N^M * C$. Accordingly, in the storage system, the total number of items in the RRS head list is as following:

$$\begin{cases} C_N^2 * 4, \text{ when } M = 2, \\ C_N^3 * 27, \text{ when } M = 3, \\ C_N^4 * 220, \text{ when } M = 4. \end{cases}$$

If the number of storage devices in the storage system is $D_1$, the number of storage devices allocated in the RRS body is as following:

$$\begin{cases} D-12, \text{ when } M = 2, \\ D-18, \text{ when } M = 3, \\ D-24, \text{ when } M = 4. \end{cases}$$

It N numbers are allocated to M groups, the possible allocation count is $C_{N+M-1}^{M-1}$. As such, the number of items in the RRS body list is as following:

$$\begin{cases} C_{D-11}^1, \text{ when } M = 2, \\ C_{D-16}^2, \text{ when } M = 3, \\ C_{D-21}^3, \text{ when } M = 4. \end{cases}$$

Consequently, the final formula for traverse time of the RRS head list and the RRS body list in the whole storage system may be obtained (where N is the number of RRS heads, M is the number of RRSs, and $D_2$ is the total number of storage devices):

$$\begin{cases} C_N^2 * 4 * C_{D-11}^1, \text{ when } M = 2, 25 \le D \le 50, \\ C_N^3 * 27 * C_{D-16}^2, \text{ when } M = 3, 51 \le D \le 75, \\ C_N^4 * 220 * C_{D-21}^3, \text{ when } M = 4, 76 \le D \le 100. \end{cases}$$

As seen from the formula, the computation complexity of the allocation algorithm is about O ($D^3$) (where D is the total number of the storage devices), which can satisfy the requirement on allocation time.

The following Table 4 lists traverse time for some user cases with different storage device configurations, to provide some basic ideas about the computation complexity. It would be noted that, since not all combinations of items in the RRS head list with the RRS body list are valid, the actual traverse time is less than the value in Table 4. It can be obtained from the results that, with enough RRS heads, it is expected that the optimal allocation method may be found within reasonable time. Since there will not be less than 3 types of storage devices in most cases, the value of N will not be greater than M either, and the total traverse time will be tolerable.

TABLE 4

| Configuration | Value | Configuration | Value | Configuration | Value |
|---|---|---|---|---|---|
| D = 26, N = 2, M = 2 | 60 | D = 51, N = 3, M = 3 | 16,065 | D = 76, N = 4, M = 4 | 5,771,770 |
| D = 50, N = 2, M = 2 | 156 | D = 75, N = 3, M = 3 | 46,197 | D = 100, N = 4, M = 4 | 17,397,380 |
| D = 26, N = 3, M = 2 | 180 | D = 51, N = 4, M = 3 | 64,260 | D = 76, N = 5, M = 4 | 28,858,850 |
| D = 50, N = 3, M = 2 | 468 | D = 75, N = 4, M = 3 | 184,788 | D = 100, N = 5, M = 4 | 86,986,900 |

Figure 5:
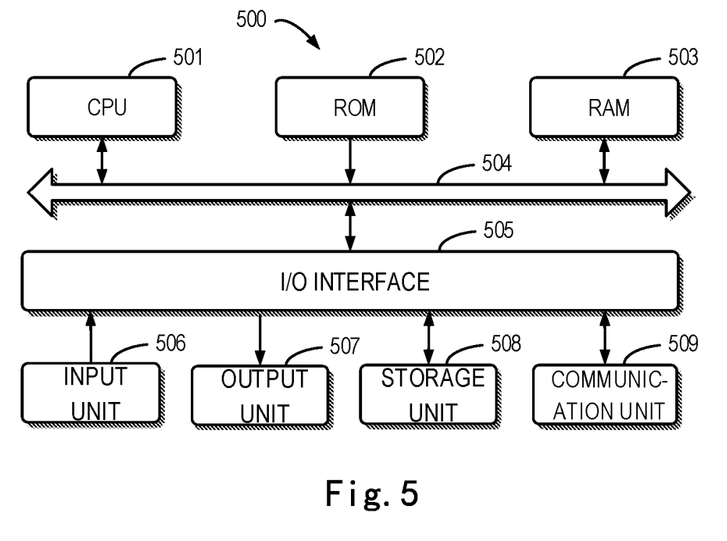
FIG. 5 shows a schematic diagram illustrating an example device that may be used to implement embodiments of the present disclosure.

FIG. 5 is a block diagram illustrating an example device 500 that can be used to implement the embodiments of the present disclosure. The device 500 may be configured as including a storage system 100. The device 500 may be used to implement the method 200 or 300 in FIG. 2 or FIG. 3.

As shown, the device 500 includes a central processing unit (CPU) 501 which performs various appropriate actions and processing, based on a computer program instruction stored in a read-only memory (ROM) 502 or a computer program instruction loaded from a storage unit 508 to a random access memory (RAM) 503. The RAM 503 stores therein various programs and data required for operations of the device 500. The CPU 501, the ROM 502 and the RAM 503 are connected via a bus 504 with one another. An input/output (I/O) interface 505 is also connected to the bus 504.

The following components in the device 500 are connected to the I/O interface 505: an input unit 506 such as a keyboard, a mouse and the like; an output unit 507 including various kinds of displays and a loudspeaker, etc.; a storage unit 508 including a magnetic disk, an optical disk, and etc.; and a communication unit 509 including a network card, a modem, and a wireless communication transceiver, etc. The communication unit 509 allows the device 500 to exchange information/data with other devices through a computer network such as the Internet and/or various kinds of telecommunications networks.

The method 200 or 300 as described above may be executed by the processing unit 501. For example, in some embodiments, the method 200 or 300 may be implemented as computer software programs or computer program products that are tangibly included in a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the method 200 or 500 as described above may be executed. Alternatively, in other embodiments, the CPU 501 may be configured in any other appropriate manners (for example, by means of firmware) to perform the method 200 or 300.

As would be understood by those skilled in the art, various steps of the method according to the present disclosure may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that, although several means or sub-means (e.g., specialized circuitry) of the device have been mentioned in detailed description above, such partition is only an example, without limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be covered within the scope of the present disclosure.

We claim:

1. A method of managing storage devices, comprising:
combining storage devices in a redundant array of independent disks into a group of storage devices in an order of physical capacities of the storage devices;
determining a first number of sets of storage devices based on a number of the storage devices in the group and a threshold number of storage devices to be divided into each of the sets, the number of the storage devices being greater than the threshold number;
selecting at least one capacity promotion set from the group of storage devices, each of the at least one capacity promotion set comprising a second number of storage devices having a same physical capacity, the second number being equal to a sum of a width of the redundant array of independent disks and a number of storage devices in each of the sets that are reserved; and
forming the first number of sets by combining each of the at least one capacity promotion set and other storage devices in the group of storage devices than the at least one capacity promotion set;
wherein forming the first number of sets comprises:
forming a plurality of groups of candidate sets by combining each of the at least one capacity promotion set with the other storage devices in the group of storage devices than the at least one capacity promotion set, each of the groups of candidate sets comprising the first number of candidate sets;
determining an effective capacity of each of the groups of candidate sets; and
determining one of the plurality of groups of candidate sets that has a maximum effective capacity as the first number of sets.

2. The method of claim 1, wherein determining one of the plurality of groups of candidate sets that has a maximum effective capacity as the first number of sets comprises:
in response to determining that a first group of candidate sets and a second group of candidate sets in the plurality of groups of candidate sets both have the maximum effective capacity, selecting a first set having a maximum effective capacity from the first group of candidate sets and a second set having a maximum effective capacity from the second group of candidate sets; and
in response to an effective capacity of the first set being greater than an effective capacity of the second set, determining the first group of candidate sets as the first number of the sets.

3. The method of claim 1, wherein:
the group of storage devices at least comprises a first subgroup of storage devices having a first physical capacity and a second subgroup of storage devices having a second physical capacity, the first physical capacity being different from the second physical capacity; and
selecting the at least one capacity promotion set from the group of storage devices comprises: for each of the first subgroup of storage devices and the second subgroup of storage devices,
in response to a number of storage devices in a respective subgroup of storage devices being above the second number, selecting the second number of storage devices from the respective subgroup of storage devices as one of the at least one capacity promotion set.

4. The method of claim 1, wherein determining one of the plurality of groups of candidate sets that has the maximum effective capacity as the first number of sets includes:
using a first storage device dividing option over a second storage device dividing option in response to evaluating the first storage device dividing option and the second storage device dividing option, the first storage device dividing option including a first redundant array of independent disks (RAID) resiliency set (RRS) and a second RRS, the second storage device dividing option including a third RRS and a fourth RRS, and the first RRS having a greatest effective capacity among the second RRS, the third RRS, and the fourth RRS.

5. A method of managing storage devices, comprising:
combining storage devices in a redundant array of independent disks into a group of storage devices in an order of physical capacities of the storage devices;
determining a first number of sets of storage devices based on a number of the storage devices in the group and a threshold number of storage devices to be divided into each of the sets, the number of the storage devices being greater than the threshold number;
selecting at least one capacity promotion set from the group of storage devices, each of the at least one capacity promotion set comprising a second number of storage devices having a same physical capacity, the second number being equal to a sum of a width of the redundant array of independent disks and a number of storage devices in each of the sets that are reserved; and
forming the first number of sets by combining each of the at least one capacity promotion set and other storage devices in the group of storage devices than the at least one capacity promotion set;
wherein:
the group of storage devices at least comprises a first subgroup of storage devices having a first physical capacity and a second subgroup of storage devices having a second physical capacity, the first physical capacity being different from the second physical capacity; and
selecting the at least one capacity promotion set from the group of storage devices comprises: for each of the first subgroup of storage devices and the second subgroup of storage devices,
in response to a number of storage devices in a respective subgroup of storage devices being above the second number, selecting the second number of storage devices from the respective subgroup of storage devices as one of the at least one capacity promotion set.

6. The method of claim 5, wherein combining storage devices in the redundant array of independent disks into the group of storage devices in the order of physical capacities of the storage devices comprises:
combining the storage devices in the redundant array of independent disks into the group of storage devices in a descending order of the physical capacities of the storage devices.

7. An electronic device, comprising:
at least one processor; and
a memory coupled to the processor, the memory storing computer programs which, when executed by the processor, cause the electronic device to perform acts comprising:
combining storage devices in a redundant array of independent disks into a group of storage devices in an order of physical capacities of the storage devices;

determining a first number of sets of storage devices based on a number of the storage devices in the group and a threshold number of storage devices to be divided into each of the sets, the number of the storage devices being greater than the threshold number;

selecting at least one capacity promotion set from the group of storage devices, each of the at least one capacity promotion set comprising a second number of storage devices having a same physical capacity, the second number being equal to a sum of a width of the redundant array of independent disks and a number of storage devices in each of the sets that are reserved; and forming the first number of sets by combining each of the at least one capacity promotion set and other storage devices in the group of storage devices than the at least one capacity promotion set;

wherein forming the first number of sets comprises:

forming a plurality of groups of candidate sets by combining each of the at least one capacity promotion set with the other storage devices in the group of storage devices than the at least one capacity promotion set, each of the groups of candidate sets comprising the first number of candidate sets;

determining an effective capacity of each of the groups of candidate sets; and determining one of the plurality of groups of candidate sets that has a maximum effective capacity as the first number of sets.

8. The electronic device of claim 7, wherein determining one of the plurality of groups of candidate sets that has a maximum effective capacity as the first number of sets comprises:

in response to determining that a first group of candidate sets and a second group of candidate sets in the plurality of groups of candidate sets both have the maximum effective capacity, selecting a first set having a maximum effective capacity from the first group of candidate sets and a second set having a maximum effective capacity from the second group of candidate sets; and in response to an effective capacity of the first set being greater than an effective capacity of the second set, determining the first group of candidate sets as the first number of the sets.

9. The electronic device of claim 7, wherein:

the group of storage devices at least comprises a first subgroup of storage devices having a first physical capacity and a second subgroup of storage devices having a second physical capacity, the first physical capacity being different from the second physical capacity; and selecting the at least one capacity promotion set from the group of storage devices comprises: for each of the first subgroup of storage devices and the second subgroup of storage devices, in response to a number of storage devices in a respective subgroup of storage devices being above the second number, selecting the second number of storage devices from the respective subgroup of storage devices as one of the at least one capacity promotion set.

10. The electronic device of claim 7, wherein determining one of the plurality of groups of candidate sets that has the maximum effective capacity as the first number of sets includes:

using a first storage device dividing option over a second storage device dividing option in response to evaluating the first storage device dividing option and the second storage device dividing option, the first storage device dividing option including a first redundant array of independent disks (RAID) resiliency set (RRS) and a second RRS, the second storage device dividing option including a third RRS and a fourth RRS, and the first RRS having a greatest effective capacity among the second RRS, the third RRS, and the fourth RRS.

11. An electronic device, comprising:

at least one processor; and a memory coupled to the processor, the memory storing computer programs which, when executed by the processor, cause the electronic device to perform acts comprising:

combining storage devices in a redundant array of independent disks into a group of storage devices in an order of physical capacities of the storage devices;

determining a first number of sets of storage devices based on a number of the storage devices in the group and a threshold number of storage devices to be divided into each of the sets, the number of the storage devices being greater than the threshold number;

selecting at least one capacity promotion set from the group of storage devices, each of the at least one capacity promotion set comprising a second number of storage devices having a same physical capacity, the second number being equal to a sum of a width of the redundant array of independent disks and a number of storage devices in each of the sets that are reserved; and forming the first number of sets by combining each of the at least one capacity promotion set and other storage devices in the group of storage devices than the at least one capacity promotion set;

wherein:

the group of storage devices at least comprises a first subgroup of storage devices having a first physical capacity and a second subgroup of storage devices having a second physical capacity, the first physical capacity being different from the second physical capacity; and selecting the at least one capacity promotion set from the group of storage devices comprises: for each of the first subgroup of storage devices and the second subgroup of storage devices, in response to a number of storage devices in a respective subgroup of storage devices being above the second number, selecting the second number of storage devices from the respective subgroup of storage devices as one of the at least one capacity promotion set.

12. The electronic device of claim 11, wherein combining storage devices in the redundant array of independent disks into the group of storage devices in the order of physical capacities of the storage devices comprises:

combining the storage devices in the redundant array of independent disks into the group of storage devices in a descending order of the physical capacities of the storage devices.

13. A computer program product having a non-transitory computer readable medium which stores a set of instructions to manage storage devices; the set of instructions, when carried out by computerized circuitry, causing the computerized circuitry to perform a method of:

combining storage devices in a redundant array of independent disks into a group of storage devices in an order of physical capacities of the storage devices;

determining a first number of sets of storage devices based on a number of the storage devices in the group and a threshold number of storage devices to be divided into each of the sets, the number of the storage devices being greater than the threshold number;

selecting at least one capacity promotion set from the group of storage devices, each of the at least one capacity promotion set comprising a second number of storage devices having a same physical capacity, the second number being equal to a sum of a width of the redundant array of independent disks and a number of storage devices in each of the sets that are reserved; and forming the first number of sets by combining each of the at least one capacity promotion set and storage devices in the group of storage devices other than the at least one capacity promotion set;

wherein forming the first number of sets comprises:

forming a plurality of groups of candidate sets by combining each of the at least one capacity promotion set with the other storage devices in the group of storage devices than the at least one capacity promotion set, each of the groups of candidate sets comprising the first number of candidate sets;

determining an effective capacity of each of the groups of candidate sets; and determining one of the plurality of groups of candidate sets that has a maximum effective capacity as the first number of sets.

14. The computer program product of claim 13, wherein determining one of the plurality of groups of candidate sets that has a maximum effective capacity as the first number of sets comprises:

in response to determining that a first group of candidate sets and a second group of candidate sets in the plurality of groups of candidate sets both have the maximum effective capacity, selecting a first set having a maximum effective capacity from the first group of candidate sets and a second set having a maximum effective capacity from the second group of candidate sets; and in response to an effective capacity of the first set being greater than an effective capacity of the second set, determining the first group of candidate sets as the first number of the sets.

15. The computer program product of claim 13, wherein:

the group of storage devices at least comprises a first subgroup of storage devices having a first physical capacity and a second subgroup of storage devices having a second physical capacity, the first physical capacity being different from the second physical capacity; and selecting the at least one capacity promotion set from the group of storage devices comprises: for each of the first subgroup of storage devices and the second subgroup of storage devices, in response to a number of storage devices in a respective subgroup of storage devices being above the second number, selecting the second number of storage devices from the respective subgroup of storage devices as one of the at least one capacity promotion set.

16. The computer program product of claim 13, wherein determining one of the plurality of groups of candidate sets that has the maximum effective capacity as the first number of sets includes:

using a first storage device dividing option over a second storage device dividing option in response to evaluating the first storage device dividing option and the second storage device dividing option, the first storage device dividing option including a first redundant array of independent disks (RAID) resiliency set (RRS) and a second RRS, the second storage device dividing option including a third RRS and a fourth RRS, and the first RRS having a greatest effective capacity among the second RRS, the third RRS, and the fourth RRS.

17. A computer program product having a non-transitory computer readable medium which stores a set of instructions to manage storage devices; the set of instructions, when carried out by computerized circuitry, causing the computerized circuitry to perform a method of:

combining storage devices in a redundant array of independent disks into a group of storage devices in an order of physical capacities of the storage devices;

determining a first number of sets of storage devices based on a number of the storage devices in the group and a threshold number of storage devices to be divided into each of the sets, the number of the storage devices being greater than the threshold number;

selecting at least one capacity promotion set from the group of storage devices, each of the at least one capacity promotion set comprising a second number of storage devices having a same physical capacity, the second number being equal to a sum of a width of the redundant array of independent disks and a number of storage devices in each of the sets that are reserved; and forming the first number of sets by combining each of the at least one capacity promotion set and storage devices in the group of storage devices other than the at least one capacity promotion set;

wherein:

the group of storage devices at least comprises a first subgroup of storage devices having a first physical capacity and a second subgroup of storage devices having a second physical capacity, the first physical capacity being different from the second physical capacity; and selecting the at least one capacity promotion set from the group of storage devices comprises: for each of the first subgroup of storage devices and the second subgroup of storage devices, in response to a number of storage devices in a respective subgroup of storage devices being above the second number, selecting the second number of storage devices from the respective subgroup of storage devices as one of the at least one capacity promotion set.

18. The computer program product of claim 17, wherein combining storage devices in the redundant array of independent disks into the group of storage devices in the order of physical capacities of the storage devices comprises:

combining the storage devices in the redundant array of independent disks into the group of storage devices in a descending order of the physical capacities of the storage devices.

* * * * *